United States Patent
Matsuo 3,944,929
Mar. 16, 1976

[54] MONITOR FOR A RECEIVER HAVING MEANS FOR SPECIFYING REGIONS WITHIN DISCRIMINATION DOMAINS OF A SIGNAL SPACE

[75] Inventor: Yoshio Matsuo, Tokyo, Japan

[73] Assignee: Nippon Electric Company, Ltd., Tokyo, Japan

[22] Filed: Nov. 22, 1974

[21] Appl. No.: 526,418

[30] Foreign Application Priority Data
Nov. 26, 1973  Japan.............................. 48-132854

[52] U.S. Cl. ............................................. 325/363
[51] Int. Cl.² ............................................ H04B 1/06
[58] Field of Search .......... 325/67, 302, 363, 31, 65

[56] References Cited
UNITED STATES PATENTS

| | | | |
|---|---|---|---|
| 2,967,998 | 1/1961 | Hurvitz .............................. | 325/363 |
| 3,189,820 | 6/1965 | Lowman ............................. | 325/363 |
| 3,407,355 | 10/1968 | Clark et al. .......................... | 325/363 |
| 3,745,465 | 7/1973 | Stover................................. | 325/363 |
| 3,792,195 | 2/1974 | Wilson et al........................ | 325/363 |

*Primary Examiner*—Albert J. Mayer
*Attorney, Agent, or Firm*—Ostrolenk, Faber, Gerb & Soffen

[57] ABSTRACT

A monitor for a receiver specifies a predetermined region within each of a plurality of continuous discrimination domains of a signal space, with each domain including a true signal point representative of an original signal which the receiver may allowably receive. The monitor compares each of the regions to the actual signal points represented in the receiver input signal and produces a monitor output signal representative of the frequency at which the actual signal points of the received signal are outside of the predetermined regions.

5 Claims, 13 Drawing Figures

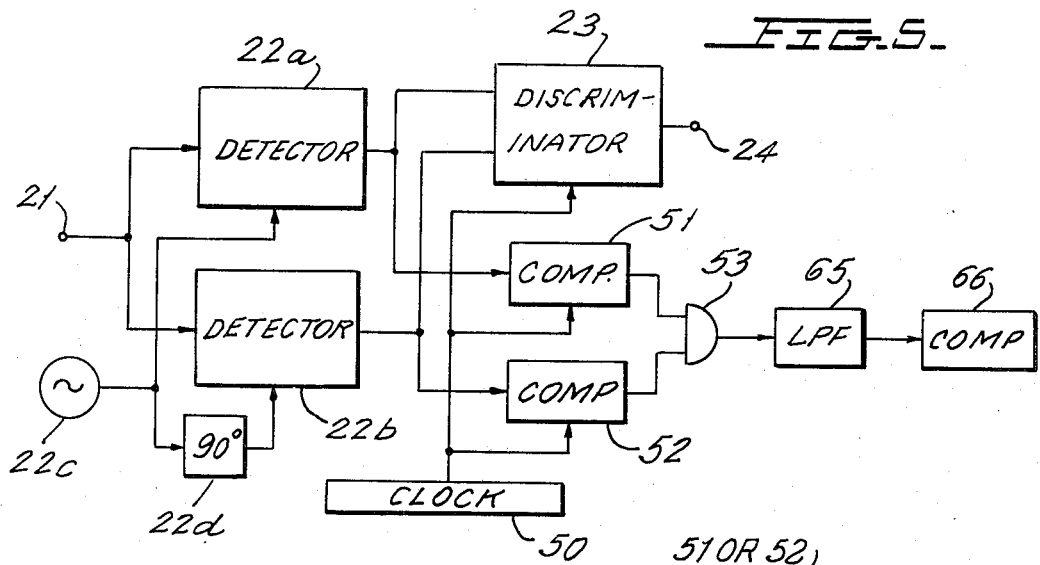
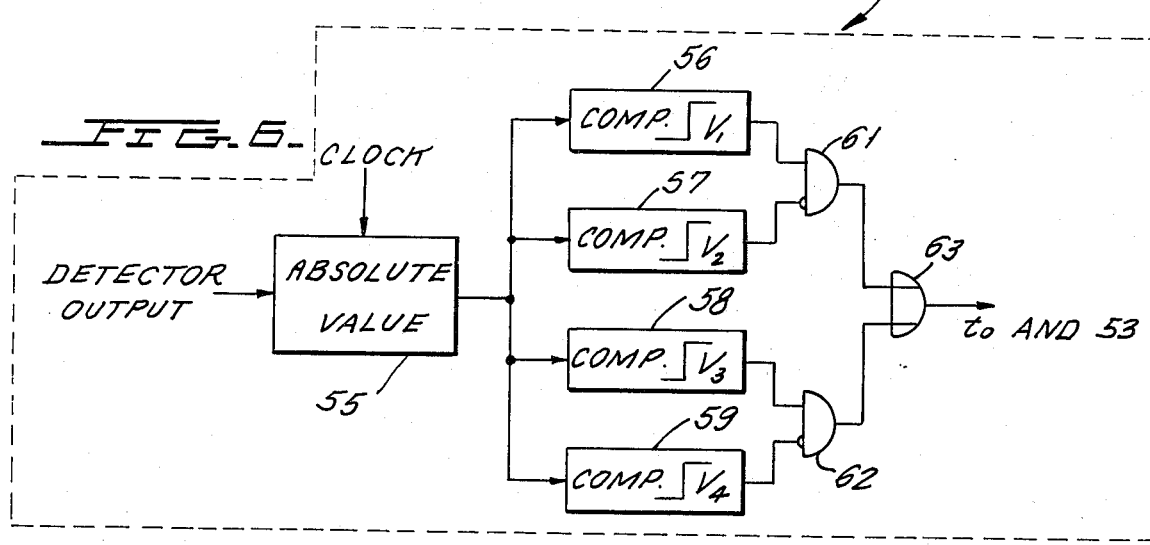
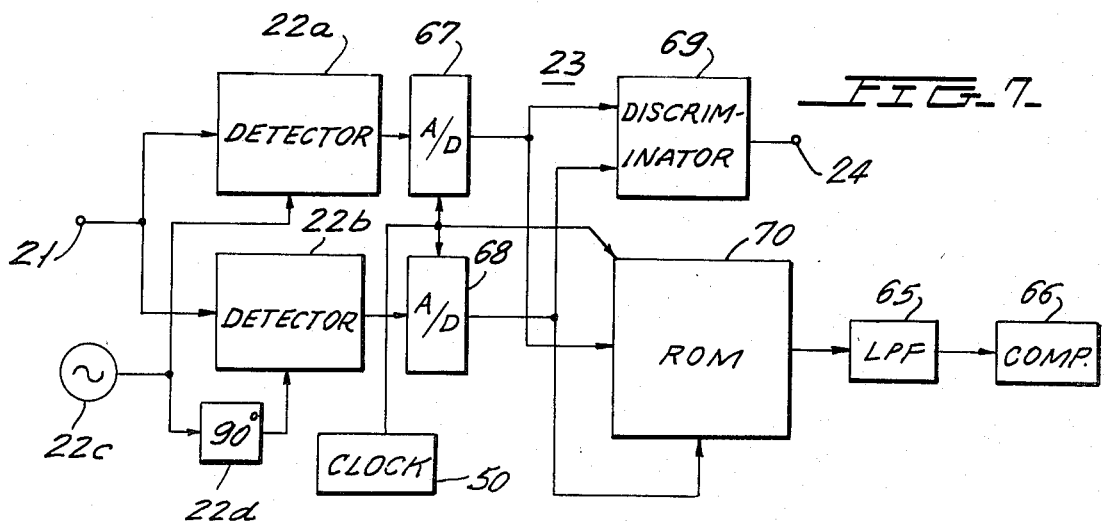

MONITOR FOR A RECEIVER HAVING MEANS FOR SPECIFYING REGIONS WITHIN DISCRIMINATION DOMAINS OF A SIGNAL SPACE

BACKGROUND OF THE INVENTION

This invention relates to a monitor for a receiver. The receiver may be that used in a repeater.

Monitors are highly important for receivers. For example, it is necessary in a high-reliability communication system comprising a pair of terminal equipments at each point of the system to switch a working equipment over to a stand-by equipment as soon as a trouble is detected in the former. On detecting such a trouble, a monitor plays an important role. In a nonstationary communication system, a monitor is resorted to on judging whether or not a communication channel is duly established. In a communication system having rather unstable transmission paths, it is the practice for a receiver to send a request for retransmission back to a transmitter when an objectionable state of reception is found at the receiver. A monitor is used to monitor the state of reception. In a burst communication system where pieces of information for synchronization, such as those for the carrier signal and clock pulses, are collected at a receiver from the signal supplied thereto, it is necessary to derive the information pieces as rapidly and precisely as possible. Inasmuch as the rapidity and precision are inconsistent requisites in this case, the practice is to switchover the modes of operation of the synchronization information extracting circuit from that for initial operation to that for stationary operation. A monitor is used to judge the instant for the switchover.

In all examples mentioned above, a monitor detects the state of reception at a receiver. It may be said that the state of reception finally means the signal-to-noise ratio of the receiver output signal in analog communication and the rate of occurrence of errors in the receiver output codes in digital communication. In order to monitor, for example, the rate of errors, it is mandatory for the monitor to know original codes sent to the receiver through transmission facilities. This, in turn, requires specific codes or words for the check purpose to be transmitted in a time division fashion and accordingly reduces the efficiency of communication. In addition, some appropriate length of time is necessary to detect a slight change in the rate of errors, which is very small under practical circumstances. It is therefore for the monitor not to directly monitor the rate of errors but indirectly with reference to a change in a certain quantity that has a relation with the signal-to-noise ratio or the rate of errors. In carrier transmission, the quantity may be a phase shift or a phase jitter of the local carrier signal produced in the receiver, a phase shift or a phase jitter of the likewise produced clock signal, the signal-to-noise ratio of the receiver input signal, the intersymbol interference appearing in the receiver input signal, a shift in the gain control circuit of the receiver, a shift in threshold levels used in the receiver, a shift in the signals appearing in certain units of the receiver, or the like. It is desirable for the monitor to monitor these quantities as much as possible to derive a monitor output signal that has direct connection with the signal-to-noise ratio of the receiver output signal or the rate of errors in the receiver output codes.

SUMMARY OF THE INVENTION

It is therefore an object of the present invention to provide a monitor for a receiver, capable of avoiding a reduction in the communication efficiency.

It is another object of this invention to provide a monitor of the type described, capable of producing a monitor output signal in a short period of time.

Before setting forth the gist of this invention, it should be pointed out that transmission of signals is carried out by bringing the original signal to be transmitted into one-to-one correspondence with pertinent ones of points (called signal points) in a multidimensional vector space whose unit vectors are given by units for independent variables, which in base band communication may be time and either voltage or current and which in carrier communication may be time, carrier frequency, and either amplitudes of the inphase and quadrature phase components (namely, amplitude of the envelope and phase thereof) or components of two orthogonal polarized signals, the vector space being called a signal space. Reception of the signal supplied to a receiver is carried out by detecting the values of the independent variables and by presuming the original signal with reference to successive combinations of the detected values. The manners of combining the detected values and of presuming the original signal differ according to the types of modulation and encoding. A demodulator or receiver invented from such a point of view is disclosed in my copending patent application Ser. No. 487,003 filed July 10, 1974, for amplitude-and-phase modulated signals. It should also be pointed out that, although a digital original signal is brought into one-to-one correspondence with discrete signal points, an analog original signal should be brought into correspondence with lines. By understanding each line to be an infinite number of points arranged with an infinite density, it is possible to deal with digital and analog communications by a unified theory.

From the next preceding paragraph, it is understood that a receiver for reproducing from an input signal an original signal sent to the receiver through transmission facilities includes a detector responsive to the input signal for producing a detector output signal and means for specifying contiguous discrimination domains in a signal space, which discrimination domains includes true signal points representative of the original signal, respectively. The receiver further includes means for discriminating in which of the discrimination domains actual signal points representative of the detector output signal are present. A monitor according to this invention is for use together with a receiver of the type described and comprises first means for specifying predetermined regions within the respective discrimination domains including the respective true signal points and second means for producing a monitor output signal indicative of the frequency of occurrence of the actual signal points within or outside of the predetermined regions.

BRIEF DESCRIPTION OF THE DRAWING

FIG. 5 illustrates a monitor according to a first embodiment of this invention together with a receiver for quadrature amplitude modulation communication;

FIG. 6 shows a comparator used in the monitor according to the first embodiment and shows a detailed example of the comparators used in FIG. 5;

FIG. 7 illustrates in blocks a monitor according to a second embodiment of this invention together with a receiver for quadrature amplitude modulation communication;

DESCRIPTION OF THE PREFERRED EMBODIMENTS

Figure 1:
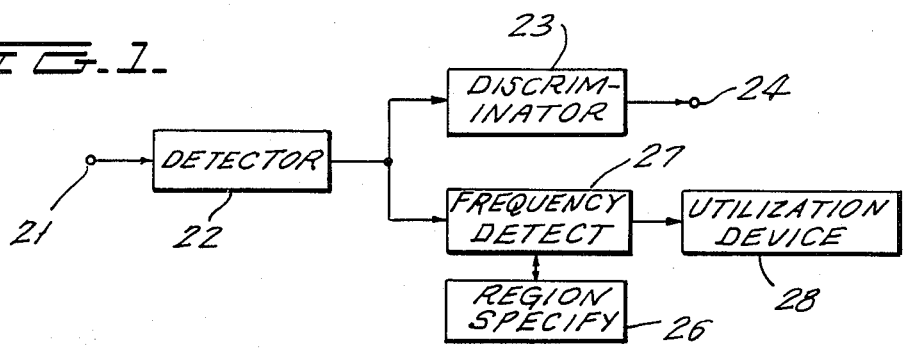
FIG. 1 illustrates in blocks a monitor according to the instant invention together with a receiver for carrier transmission.

Referring to FIG. 1, a receiver for carrier transmission comprises an input terminal 21 for the signal supplied from a transmitter (not shown) through a transmission path, a detector 22 for the input signal, and a discriminator 23 for specifying contiguous discrimination domains in a signal space so as to include respective true signal points representative of the original signal sent to the receiver through the transmission facilities and for discriminating in which of the discrimination domains actual signal points representative of the detector output signal are present. The receiver further comprises an output terminal 24 for the discriminator output signal. Although the detector 22 and discriminator 23 are separately depicted in FIG. 1, the discriminator 23 may be deemed as a portion of the detector 22 in case use is made of the result of discrimination in extracting the local carrier and clock signals used in the receiver. A monitor for use together with the receiver according to this invention comprises first means 26 for specifying predetermined regions within the respective discrimination domains including the respective true signal points. The monitor further comprises second means 27 for detecting in the manner also later described the frequency of the actual signal points representative of the decoder output appearing within or outside of the predetermined regions to produce a monitor output signal indicative of the frequency. A utilization device 28 is connected to the second means 27 to utilize the monitor output signal. The utilization device 28 may be, as described in the preamble of the instant specification, a circuit for switching the working transmitter and/or receiver over to the stand-by one or ones, a device for requesting the retransmission, or a circuit for switching over the modes of operation of the synchronization signal extracting circuit.

Figure 2:
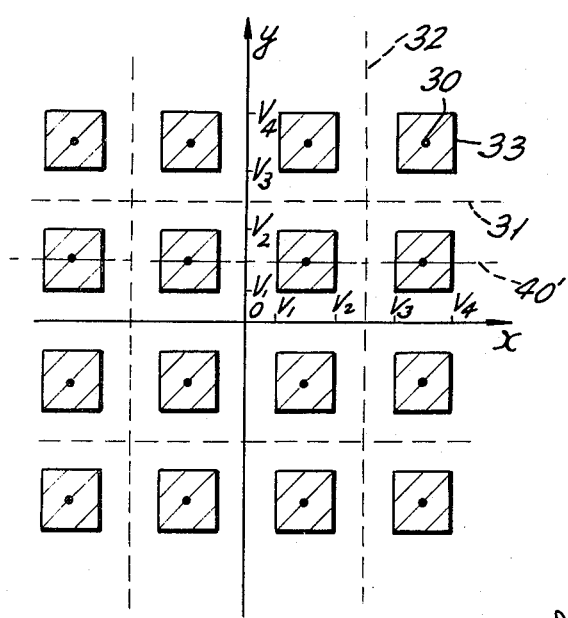
FIG. 2 shows a signal space or plane for quadrature amplitude modulation communication.

Referring to FIG. 2, a signal for quadrature amplitude modulation communication, which is a sort of carrier digital transmission, is two-dimensional and becomes a signal plane when the product of duration T of a symbol and width W of the transmission band is equal to unity. Either in case the product is equal to two or more or in case use is made of two orthogonal polarized signals, the dimensions become three or more so that illustration is difficult although this invention is equally well applicable to these cases. In FIG. 2, an X and Y axis represent the inphase and quadrature phase components of a synchronous detector output signal. It is now presumed that the information to be transmitted is sent out at a transmitter as selected ones of sixteen signal points, such as a point referred to by a reference numeral 30. With this sixteen signal points, it is possible to transmit four-bit digital information pieces per symbol or per duration T. During transmission through a transmission path, the signal is subjected to noises and interference so that the signal supplied to the receiver can no more be represented by corresponding signal points on a like reference plane. The latter signal plane will herein be called also a signal plane. The corresponding signal points, such as 30, are called true signal points. Signal points, namely, actual signal points representative of the signal actually supplied to the receiver therefore appear at certain points adjacent to the respective true signal points. One of the methods for estimating most probable true signal points from the actual signal points is to divide, at first, the signal plane into a plurality of contiguous decision or discrimination domains by equally spaced orthogonal lines, such as 31 and 32, parallel to and including the X and Y axes, so that the discrimination domains may include the respective true signal points. Secondly, it is detected in which of the discrimination domains the actual signal points fall. The signal supplied to the receiver is looked upon as being representative of the true signal points existent in the discrimination domains successively determined as a result of the detection.

In FIG. 2, a plurality of regions are shown within the respective discrimination domains by hatched squares enclosed by short line segments, such as 33. $V_1$, $V_2$, $V_3$, and $V_4$ represent the X or Y coordinates of the short line segments. Each of the regions is narrower than the relevant one of the discrimination domains and includes the true signal point of the relevant discrimination domain. Although square regions are shown for convenience of practical design of the first means 26, the regions may be rectangular. Circular regions are preferred from the theoretical point of view.

Figure 3:
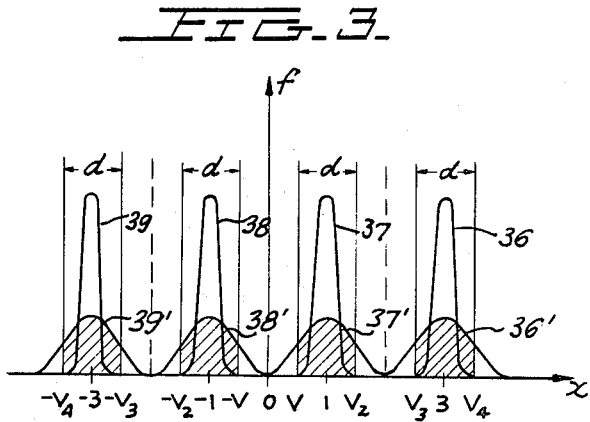
FIG. 3 shows frequencies of signals actually falling at a receiver on the signal plane along a line.

Referring to FIG. 3 curves 36, 37, 38, and 39 show probability distribution of the actual signal points on a line, such as 40' depicted in FIG. 2, when the information actually transmitted is equally probably represented by the sixteen signal points on the transmitter side and when the noises and interference are given by a Gaussian distribution for each of the true signal points. When the probability distribution is given by the curves 36 through 39, the frequency of the actual signal points falling within the sixteen regions exemplified in FIG. 3 by a letter "d" and by the abscissae $V_3 \sim V_4$, $V_1 \sim V_2$, $-V_2 \sim -V_1$, and $-V_4 \sim -V_3$ is approximately equal to unity in terms of probability. With larger noises and interference, the probability distribution becomes broader as exemplified by curves 36', 37', 38', and 39'. In the latter case, the frequency is given by a summation of sixteen hatched areas, only four of which are illustrated in FIG. 3. The frequency shows a rapid decrease with an increase in the noises and interference. This applies not only to a two-dimensional signal space but also to signal spaces of three or more dimensions.

Figure 4:
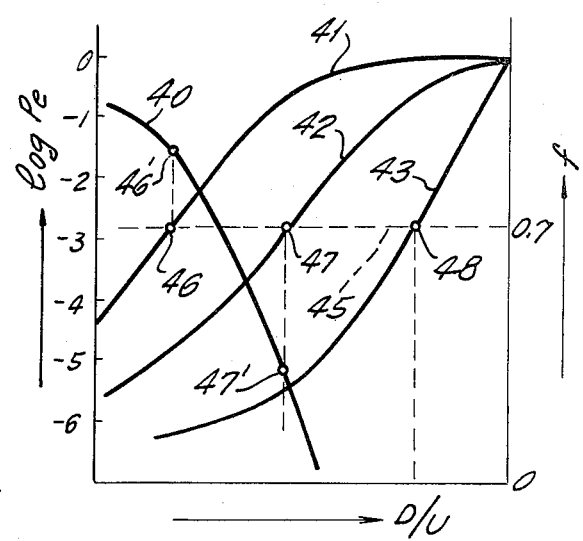
FIG. 4 shows rates of occurrence of errors in receiver output codes and the frequencies, such as mentioned in conjunction with FIG. 3, versus D/U ratios.

Referring to FIG. 4, the abscissa shows those so-called D/U ratios, namely the ratios of desired signals to undesired signals, which decrease with an increase in the noises and interference. The ordinate shows common logarithms of the rates of occurrence of errors in terms of the probability Pe and the above-mentioned frequency $f$. A curve 40 is known as a rate-of-error curve indicative of log Pe versus D/U. Being given in logarithms, the rate of errors show a steep decrease with an increase in the D/U ratios. A range between $10^{-4}$ and $10^{-7}$ of the rates of errors (between $-4$ and $-7$ if expressed in logarithm) is available for practical communication. Curves 41, 42, and 43 show the frequencies for wide, medium, and narrow regions. An initial decrease in the frequencies that occurs with a decrease in the D/U ratios becomes steeper when the regions are made narrower as mentioned with reference to FIG. 3. If the regions were as wide as the discrimination domains, the frequency would be always equal to unity irrespective of the D/U ratios.

The curves 40 through 43 depicted in FIG. 4 are not only indicative of the fact that a monitor according to this invention monitors a variation in the noises and interference but are also useful in designing such a monitor. By way of example, it is presumed that a monitor should indicate if the frequency is above or below a threshold level of 0.7 shown in FIG. 4 by a horizontal dashed line 45. With the use of wide regions which result in the curve 41, the monitor output signal indicates whether the D/U ratio is greater or smaller than a value corresponding to an intersection 46 of the curve 41 and the dashed line 45, namely, whether the rate of errors is smaller or greater than a value given by a point 46' on the curve 40. With the use of medium-area regions, the monitor output signal indicates whether the D/U ratio is greater or smaller than a value corresponding to another intersection 47 and whether the rate of errors is smaller or greater than a value represented by another point 47' on the curve 40. When it is desired to monitor the rates of errors by the use of a very small threshold value or criterion, the first means 26 should specify narrow regions that may result in the curve 43. Although not shown in FIG. 4, the threshold rate of errors corresponding to still another intersection 48 of the curve 43 and the dashed line 45 is below $10^{-7}$.

Monitoring with this small threshold value by a conventional monitor requires a considerable length of time which may amount to $10^8$ symbols or more. In contrast, a monitor according to this invention is capable of monitoring the signal supplied to the receiver in question with this small threshold value within a short period of time. In addition, it should be noted with reference to FIG. 2 that the regions are specified including all true signal points, respectively. This means that a monitor according to this invention is capable of monitoring whatever pattern the signal may have. In other words, the monitor is operable without the use of specific words for the check purposes. This applies not only to quadrature amplitude modulation but also to other modes of transmission as will be understood from the following.

The above description is applicable also to other causes which reduce the rate of errors. For example, it may be surmised in conjunction with FIG. 2 that a phase shift occurred in the local carrier signal used in the receiver. The actual signal points now appear on the signal plane at points which the true signal points will assume when the signal plane is rotated around the origin 0 of the coordinates by an angle indicative of the phase shift. The frequency of the actual signal points appearing within the predetermined regions decreases accordingly. If a shift occurs in the timing of the clock pulses, the intersymbol interference grows larger. This is equivalent to an increase in the noises. If a drift appears in the detector output signal, the actual signal points appear at points which the true signal points will assume when subjected to translation. When the level of the signal supplied to the receiver lowers, a similar decrease occurs in the frequency.

Referring now to FIG. 5, a receiver for quadrature amplitude modulation communication comprises an input terminal 21, a pair of detectors 22a and 22b for the inphase and quadrature phase components of the signal supplied to the input terminal 21, and a local oscillator 22c for supplying a local carrier signal to the inphase detector 22a directly and to the quadrature phase detector 22b through a 90° phase shifter 22d. The output signals of the detectors 22a and 22b are what may be given by abscissae and ordinates in FIG. 2. These output signals are discriminated by a discriminator 23 of the type described and thereafter supplied to an output terminal 24. A clock generator 50 produces clock pulses for specifying the time of discrimination. A monitor for use with the receiver according to a first embodiment of this invention comprises a pair of comparator circuits 51 and 52 for comparing the respective detector output signals with levels provided thereby and a two-input AND gate 53 for the output signals of the comparator circuits 51 and 52. The comparison is preferably carried out at the same time points specified by the clock pulses as those used in discrimination.

Referring to FIG. 6 for a short while, each of the comparator circuits 51 and 52 comprises an absolute value circuit 55 responsive to the clock pulses for sampling the output signals of the pertinent one of the detectors 22a and 22b and producing an output signal representative of the absolute values of the successive samples; four unit comparators 56, 57, 58, and 59 for simultaneosuly comparing the absolute value signal with threshold values $V_1$, $V_2$, $V_3$, and $V_4$ provided thereby; a pair of inhibit gates 61 and 62 connected to the unit comparators 56 through 59 as shown, and an OR gate 63 responsive to the output signals of the inhibit gates 61 and 62. It will be understood that the inhibit gate 61 connected to the unit comparators 56 and 57 produces a logic "1" pulse when the detector output signal assumes at a sampling point a value between $-V_2 \sim -V_1$ or between $V_1 \sim V_2$ and otherwise produces a logic "0" pulse. The inhibit gate 62 connected to the unit comparators 58 and 59 produces a logic "1" pulse when the detector output signal assumes at the sampling point a value between $-V_4 \sim -V_3$ or between $V_3 \sim V_4$ and otherwise produces a logic "0" pulse. As a result, the OR gate 63 produces a logic "1" pulse only when the value of the detector output signal at a sampling point is between $-V_4$ and $-V_3$, $-V_2$ and $-V_1$, $V_1$ and $V_2$, or $V_3$ and $V_4$.

Returning to FIG. 5, it will now be understood that the AND gate 53 produces a logic "1" output pulse when the detector output signals are within the regions depicted with reference to FIG. 2 and that the comparator circuit 51 and 52 or the unit comparators 56 through 59 of the comparator circuits 51 and 52 comprise the first means 26 described with reference to FIG. 1. The monitor further comprises a low-pass filter 65 for the AND gate output signal. Inasmuch as the logic "1" and "0" pulses assume a high and a low level, the low-pass filter 65 produces due to its averaging function a monitor output signal indicative of the frequency of the actual signal points representative of the decoder output signals appearing within the predetermined regions. If the AND gate output signal comprises pulses of a duty factor of 100% and if 1 volt and 0 volt correspond to the logic "1" and "0" pulses, respectively, the low-pass filter output signal becomes 1 volt when the frequency is equal to unity in terms of the probability. Although the low-pass filter 65 may be of an analog type, the same may be a digital type because the input signal is digital. An additional comparator 66 connected to the low-pass filter 65 is not an indispensable element of a monitor according to this invention but is a portion of the utilization device 28 described in conjunction with FIG. 1. With the threshold level for the additional comparator 66 set at a certain level, it is possible to obtain a comparator output signal indicative of whether the rate of errors is above or below a certain criterion given by the level set for the comparator 66.

Referring to FIG. 7, a monitor according to a second embodiment of this invention and accompanied by a low-pass filter 65 and an additional comparator 66 is for a receiver for quadrature amplitude modulation communication comprising similar elements designated by like reference numerals as in FIG. 5. The discriminator 23 comprises a pair of analog-to-digital converters 67 and 68 responsive to the clock pulses for converting the detector output signals into digital signals representative of the inphase and quadrature phase components. The discriminator 23 further comprises either a logic circuit or a read-only memory 69 responsive to the digital signals for reproducing the original signal. As described in the above-referenced patent application, the analog-to-digital conversion defines the discrimination domains in the signal space. In addition, it is possible to select the quantization steps so that the digital codes of each digital signal may vary as an actual signal point traverses, when moving along a line parallel to the $x$ or $y$ axis, the boundary lines between the discrimination domains and the line segments for the predetermined regions. The monitor comprises a read-only memory 70 responsive to the digital signals for producing a logic "1" and a logic "0" pulse when a digital signal pair specifies a predetermined region and the remainder of the regions, respectively.

Figure 8:
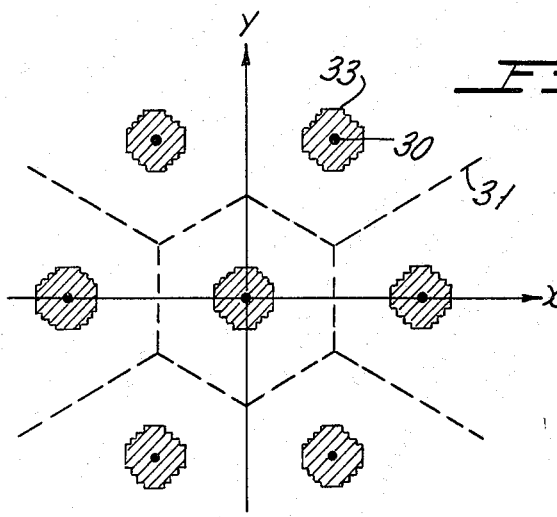
FIG. 8 shows a signal space for simultaneous or composite modulation communication.

Referring to FIG. 8, seven true signal points, such as 30, and boundary lines, such as 31, for the discrimination domains are depicted on a signal plane for two-amplitude-level and six-phase composite modulation communication. Circular predetermined regions are preferred for the respective signal points because they give best results for those noises and interference whose $x$ and $y$ components are independent of each other and have an equal dispersion. As an approximation, each of the regions is bounded by a region boundary line 33 shown in FIG. 8. It is difficult to define the predetermined regions by the use of a combination of comparators illustrated with reference to FIGS. 5 and 6. A read-only memory 70 therefore must be resorted to, with the quantization steps selected in accordance with the staircase lines 33 defining the regions. It will now be understood that the second embodiment is preferred in case complicated shapes are required of the predetermined regions and that a signal space is readily mapped on a read-only memory irrespective of the shape of the predetermined regions.

Figure 9:
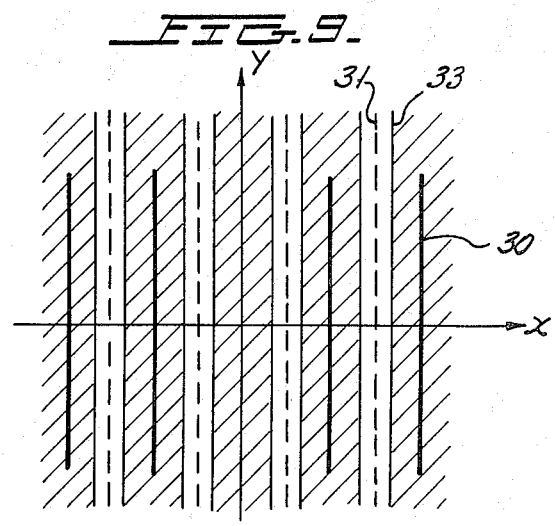
FIG. 9 shows a signal space for pulse amplitude and phase modulation communication.

Referring to FIG. 9, pulse amplitude modulation is a sort of analog modulation, wherein analog information pieces are given by digital quantities representative approximately of the information pieces and analog quantites representative of the quantization errors of the respective digital quantites. The digital and analog quantites are transmitted as the inphase and quadrature phase components given by the abscissae and ordinates on a signal plane. Thick lines, such as 30, correspond to the true signal points. The discrimination domains for the digital quantites are bounded by dashed lines, such as 31. It is therefore possible to select predetermined regions bounded by region boundary lines, such as 33, and depicted with hatches. Both the theory for predetermining the regions in this manner and operation of a monitor for pulse amplitude phase modulation communication will be understood when the signal line segments, such as 30, are deemed as a limit of infinite signal points as a mentioned in the preamble of the instant specification.

Figure 10:
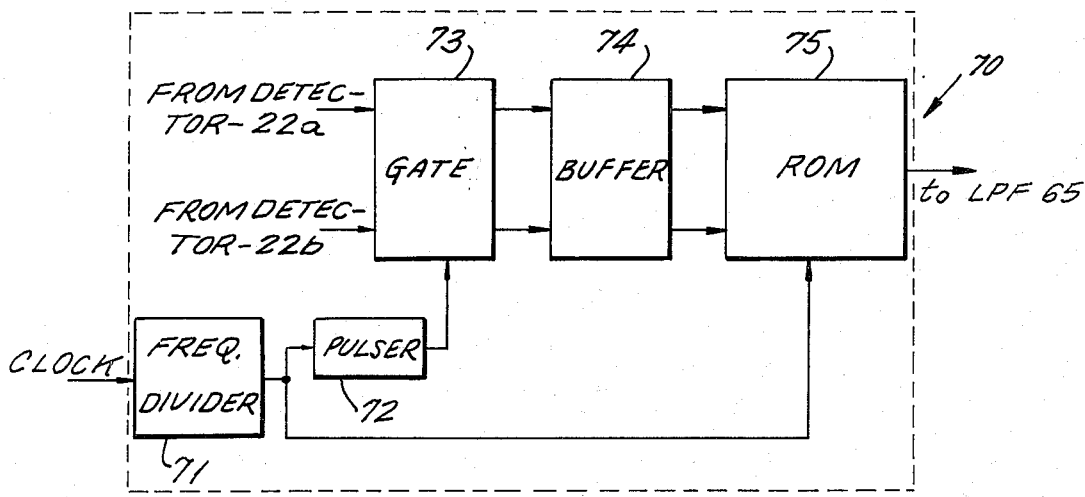
FIG. 10 is a block diagram of an arrangement for use in a monitor according to the second embodiment in place of a portion thereof.

Referring now to FIG. 10, a monitor according to the second embodiment may comprise, in place of a single memory 70 illustrated with reference to FIG. 7, a frequency divider 71 for dividing the frequency of the clock pulses, a pulser 72 for sharpening the frequency-divided clock pulses, a gate 73 responsive to the frequency-divided and sharpened pulses for sampling the digital signals, a buffer memory 74 for temporarily storing the sampled signals, and a constituent read-only memory 75 which is similar to the read-only memory 70. The modification is preferred when the rate of transmission of the symbols is considerably higher than the speed of read-out of the memory 70. In other words, the monitor according to this modification monitors only some of the received symbols rather than all received symbols. It should be understood in connection with this modification that the analog-to-digital conversion reaches a limit of speed faster than the readout of a read-only memory and may likewise be carried out only for same of the symbols.

Figure 11:
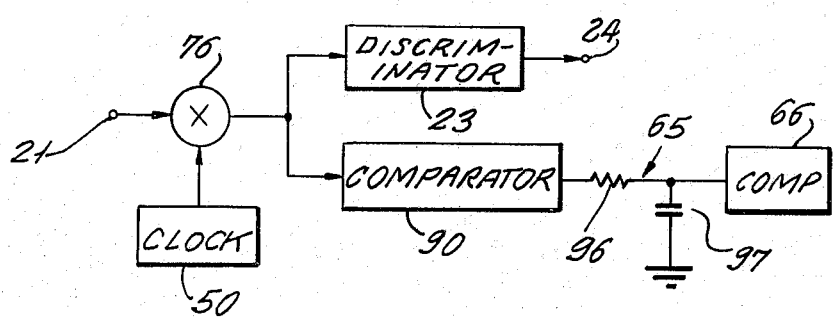
FIG. 11 illustrates mainly in blocks a monitor according to a third embodiment of this invention together with a receiver for binary pulse base band communication.
Figure 12:
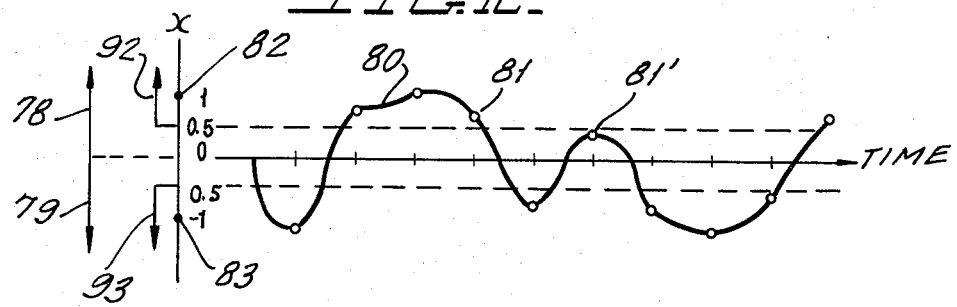
FIG. 12 shows a wave form of the binary pulses as received.
Figure 13:
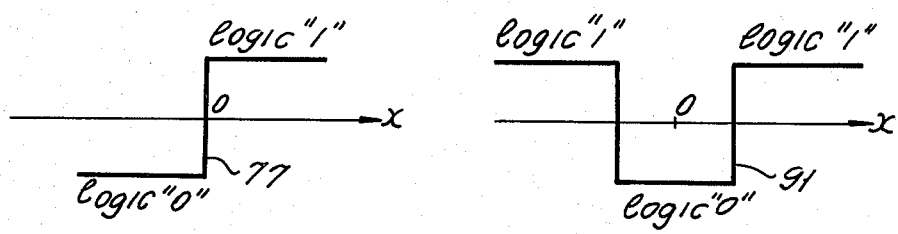
FIG. 13 shows characteristics of several circuit elements of the monitor according to the third embodiment.

It is to be noted that a signal space for base band transmission becomes one-dimensional when $WT = \frac{1}{2}$ as shown in FIG. 12. Referring now to FIG. 11, a receiver for binary pulse communication comprises an input terminal 21, a discriminator 23, an output terminal 24, a clock generator 50, and a sampler 76 responsive to the clock pulses for sampling the input signal to supply the sampler output signal to the discriminator 23. The discriminator 23 may discriminate by discrimination characteristics shown in FIG. 13 at 77 whether the sampler output signal is above or below the time axis depicted in FIG. 12. The discrimination domains are indicated in FIG. 12 by arrows 78 and 79. In FIG. 12, the actual signal supplied to the input terminal is shown by a curve 80. Actual samples are indicated by small circles, such as 81. If the actual samples as above the time axis, the discriminator 23 determines the same to be representative of a logic "1" value given by a true signal point 82. Otherwise, the discriminator 23 locates the actual signal samples to be representative of a logic "0" value shown at 83 ($x = -1$). A monitor according to a third embodiment of this invention comprises a comparator 90 whose comparison characteristics are exemplified in FIG. 13 at 91. The characteristics do specify predetermined regions 92 and 93 by the ranges at which the comparator output signal assumes a logic "1" value. Whenever the comparator output signal becomes logic "1," the actual signal points fall within the predetermined regions 92 or 93. If the comparator output signal becomes logic "0," the actual signal points, such as a point designated by 81' in FIG. 12, fall outside of the predetermined regions 92 and 93. Therefore the comparator output signal indicates the frequency of the actual signal points falling within and outside of the predetermined regions 92 and 93, namely, the extent to which the input signal is subjected to noises and interference and to which the clock pulses are out of phase. The comparator 90 is accompanied by a low-pass filter 65 and an additional comparator 66. Here, the low-pass filter comprises a resistor 96 interposed between the monitor comparator 90 and the additional comparator 66 and a capacitor 97 connected between ground and a point of connection of the resistor 96 and the additional comparator 66.

What is claimed is:

1. A monitor for a receiver reproducing an original signal from an input signal sent to said receiver through transmission facilities, said original signal being represented by a sequence of true signal points each contained in one of a plurality of contiguous discrimination domains specified in a signal space, said receiver including a detector responsive to said input signal for producing a detector output signal having electrical characteristics successively representing each actual signal point of said input signal in said signal space, said monitor comprising:

first means for providing electrical characteristics specifying a predetermined region within each of the respective discrimination domains, each said region including the respective true signal point contained within the associated discrimination domain; and second means operatively coupled to said first means and to said detector output for measuring the frequency at which the electrical characteristics of each said actual signal point coincides with the electrical characteristics of any of said predetermined regions to produce a monitor output signal indicative of the frequency at which the actual signal points occur within said predetermined regions.

2. A monitor as claimed in claim 1, wherein said second means comprises:

third means operatively coupled to said first means and to said detector output for comparing the electrical characteristics of each actual signal point with the electrical characteristics of all of said predetermined regions to produce a first signal and a second signal when the electrical characteristics of each of said actual signal points are within and outside, respectively, of said preselected electrical characteristics of said predetermined regions; and fourth means connected to said third means for averaging said first and second signals with respect to time to produce said monitor output signal.

3. A monitor as claimed in claim 2, wherein the threshold values for said third means are established by the preselected electrical characteristics provided by said first means.

4. A monitor as claimed in claim 2, wherein:

said first means comprises memory means for storing each of said preselected electrical characteristics as a set of a first and a second value at one of a plurality of addresses specified in accordance with said predetermined regions and the remainder of said signal space and said second means further comprises means connected to said detector and operatively coupled to said memory means for addressing said memory means to recall said first and second values to establish a set of threshold values for said comparing means.

5. A monitor as claimed in claim 4, wherein said address means comprises:

means for sampling said detector output signal and means responsive to the sampled detector output signal for addressing said memory means.

* * * * *